US010105582B1

United States Patent
Jones

(10) Patent No.: US 10,105,582 B1
(45) Date of Patent: Oct. 23, 2018

(54) DUMBBELL BENCH RACK ASSEMBLY

(71) Applicant: Taylor V. Jones, New Orleans, LA (US)

(72) Inventor: Taylor V. Jones, New Orleans, LA (US)

( * ) Notice: Subject to any disclaimer, the term of this patent is extended or adjusted under 35 U.S.C. 154(b) by 0 days.

(21) Appl. No.: 15/635,024

(22) Filed: Jun. 27, 2017

(51) Int. Cl.
*A63B 71/00* (2006.01)
*A63B 21/072* (2006.01)
*A63B 21/00* (2006.01)
*F16M 11/28* (2006.01)

(52) U.S. Cl.
CPC ...... *A63B 71/0036* (2013.01); *A63B 21/0726* (2013.01); *A63B 21/4035* (2015.10); *A63B 71/0054* (2013.01); *F16M 11/28* (2013.01); *F16M 2200/028* (2013.01)

(58) Field of Classification Search
CPC ........... A63B 71/0036; A63B 21/4035; A63B 21/0726; A63B 71/0054; F16M 11/28; F16M 2200/028
See application file for complete search history.

(56) References Cited

U.S. PATENT DOCUMENTS

| | | | | |
|---|---|---|---|---|
| 4,666,150 A | * | 5/1987 | Segrist | A63B 21/078 211/85.7 |
| 5,725,460 A | * | 3/1998 | Marsh | A63B 21/078 482/104 |
| 5,924,964 A | * | 7/1999 | Hayden | A63B 21/4029 482/104 |
| 5,971,898 A | * | 10/1999 | Schoolfield | A63B 21/4029 482/104 |
| 7,534,198 B1 | * | 5/2009 | Strong | A63B 21/078 482/108 |
| 2011/0247531 A1 | * | 10/2011 | Sunderland | A47B 23/06 108/145 |
| 2016/0192774 A1 | * | 7/2016 | Hwang | A47B 23/007 248/445 |
| 2017/0326411 A1 | * | 11/2017 | Watterson | A63B 24/0075 |

* cited by examiner

*Primary Examiner* — Ko H Chan
(74) *Attorney, Agent, or Firm* — Law Office of Jeff Williams; J. Oliver Williams

(57) ABSTRACT

The present application discloses and describes a dumbbell bench rack assembly having a tray, a post, and a support. The assembly provides a place for users to temporarily hold dumbbell weights while working out on a weight bench. The post is inserted into an existing rack stand to keep the assembly vertical. The assembly also includes a tray were the dumbbell is temporarily placed. The tray is composed of two plates, in communication with each other at one edge and which extend above a horizontal. The tray's configuration secures the dumbbell and minimizes the possibility of the dumbbell accidentally falling out of the tray. Finally, the assembly includes a support piece which stabilizes the tray and minimizes excessive flexure of the tray when a weight is placed in it.

16 Claims, 8 Drawing Sheets

DUMBBELL BENCH RACK ASSEMBLY

BACKGROUND

1. Field of the Invention

The present invention is related to a personal fitness assembly in conjunction with the use of free weights, specifically related to the use of a dumbbell and weight bench.

2. Description of Related Art

There are many different methods used to exercise the body. People often choose to use either machines or free weights to build body muscle or strengthen one's body. Use of free weights is touted as having advantages over the use of machines, and to some is the preferred method. Using free weights does have some disadvantages, such as the need to move the weights around and handling them between exercises. For example, when using a weight bench, a user must either hold onto the weights (dumbbells) while getting into position for the exercise or put the weights on the ground and lift them up into position. In either scenario, the user is exposed to possible injuries to the user's neck, back, and stomach muscles through unsafe lifting techniques. There is a common desire to avoid unsafe lifting techniques and possible injury.

Various different types of devices have been developed to attempt to mitigate possible injuries when using free weights (i.e. dumbbells). Such devices are typically used to try and support the free weight between exercises. In doing so, the devices are generally bulky, requiring the user to use multiple hands to operate. These may be attached to the weight bench or include separate stands. Additionally, some devices do not have adequate support to minimize flexure when loaded. Too much flexure can result in a springing effect and destabilization of the weight in the device. Furthermore, some devices are designed with shallow holding areas which can be too small to keep the weight from rolling out of the assembly. All these scenarios present a danger of a weight falling on a user.

Although strides have been made in providing users a safe and effective place to rest free weights while working out, considerable shortcomings remain. It is desirable to provide users an assembly that is compact, has adequate support to avoid excessive flexure, and designed to keep the free weight secured inside the assembly so as to prevent falling out.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
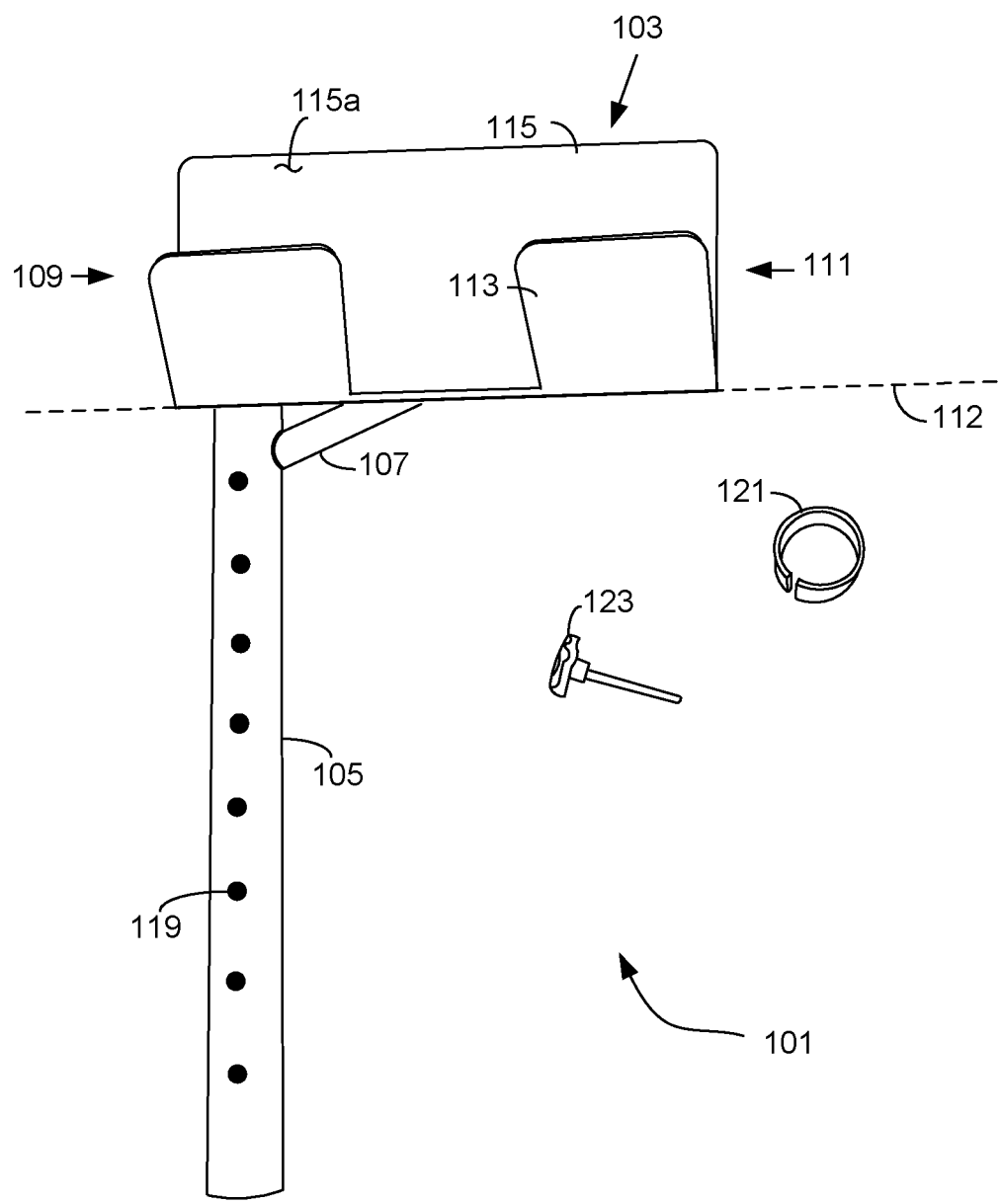
FIG. 1 is a front perspective view of a dumbbell bench rack assembly.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The assembly and method in accordance with the present application overcomes one or more of the above-discussed problems commonly associated with conventional rack assemblies. The dumbbell bench rack assembly of the present application is configured to provide users with a safe and effective place to rest dumbbells during the user's workout with free weights. The dumbbell bench rack assembly is compact, has additional support to negate excessive flexure, and designed to prevent spillage of the free weights. These and other unique features of the device are discussed below and illustrated in the accompanying drawings.

The assembly and method of the present application is illustrated in the associated drawings. The device includes a post which is connected to one end of a tray. There is also a support piece that is connected to the post and connects to the tray on the opposite end of the tray. The tray is where dumbbells are temporarily stored while users work out at a weight benchbench. Additional features and functions of the device are illustrated and discussed below.

Figure 2:
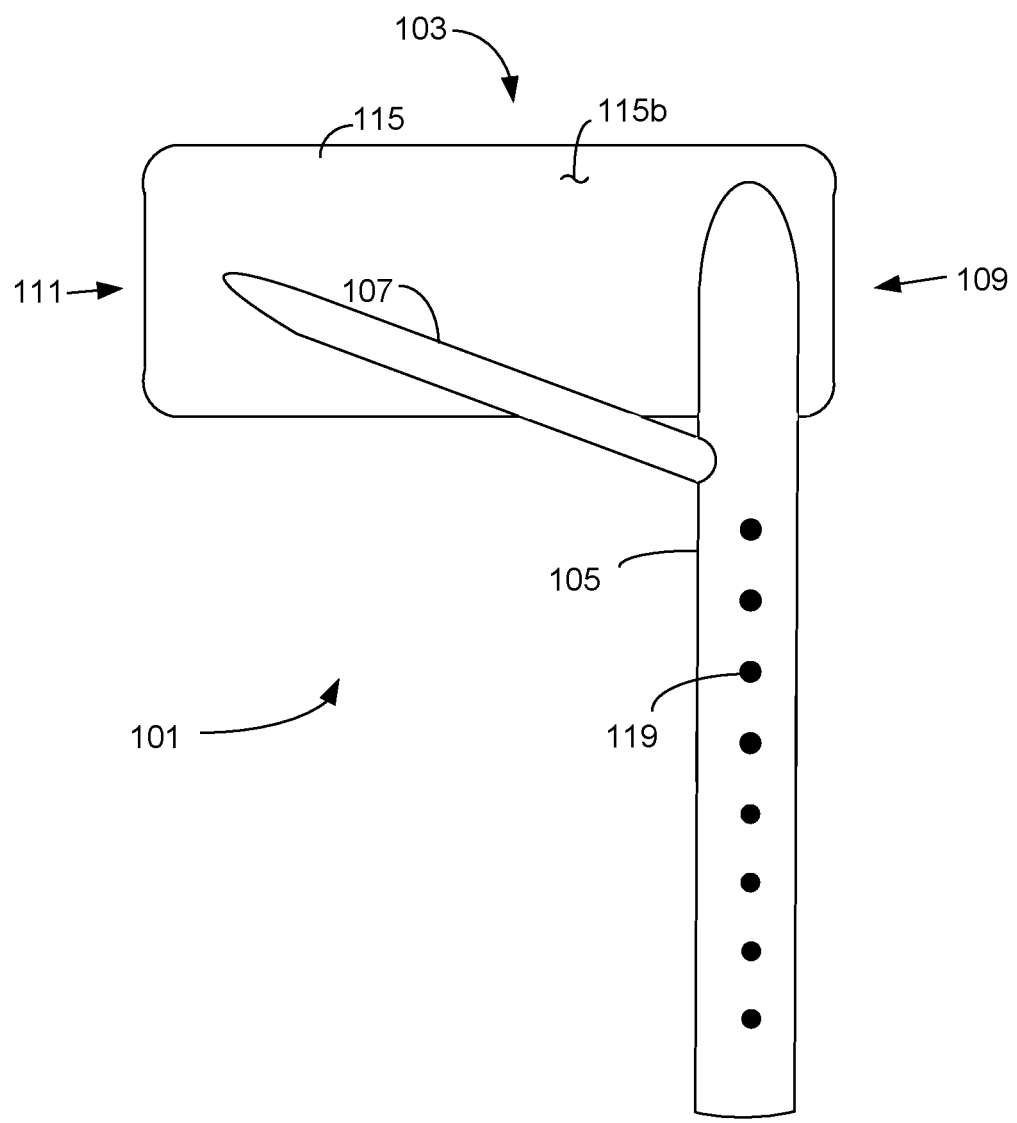
FIG. 2 is a partial rear view of the dumbbell bench rack assembly of FIG. 1.
Figure 3:
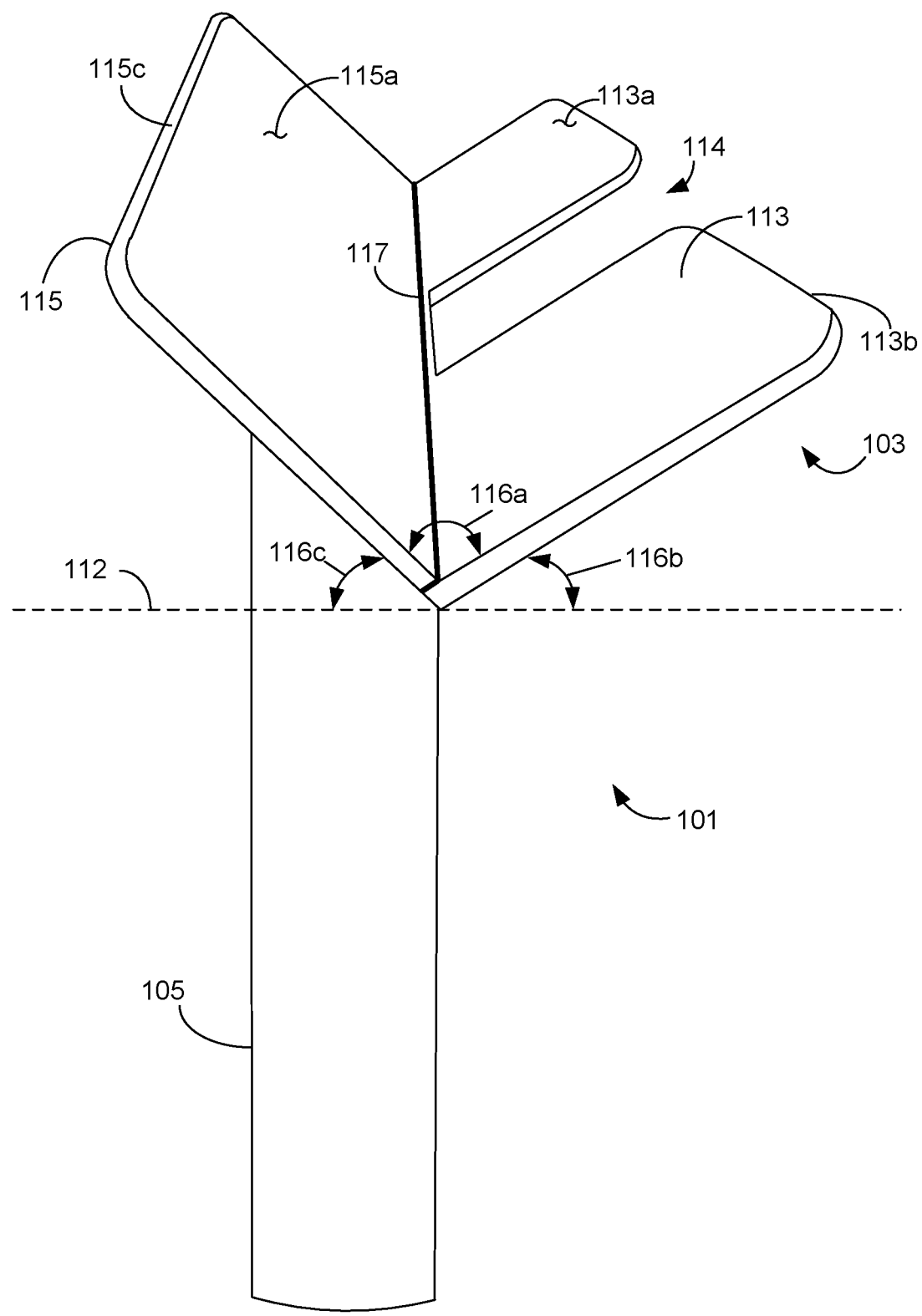
FIG. 3 is a side view of the dumbbell bench rack assembly of FIG. 1.

Referring now to the drawings wherein like reference characters identify corresponding or similar elements in form and function throughout the several views. FIGS. 1-3 are illustrating front perspective, rear perspective, and side view of a dumbbell bench rack assembly 101 respectively. The assembly 101 is composed of a tray 103, a post 105, and a support 107. Assembly 101 is configured to secure a load in an elevated position above a weight bench.

Tray 103 is configured to cradle the load (i.e. dumbbells) and prevent the load from becoming dislodged or falling. Tray 103 is defined by a forward member 113 and a rear member 115 which are configured to cradle the load. Forward member 113 has an inner surface 113a and an outer edge 113b. Rear member 115 has an inner surface 115a, an outer surface 115b and an outer edge 115c. The load rests upon surfaces 113a and 115a. Forward member 113 and rear member 115 are each planer and are coupled along a joint 117. It is understood that joint 117 is created by any commonly used method of joining two materials together which could include welding and soldering.

Inner surfaces 113a and 115a are angled toward each other creating angle 116a. Members 113 and 115 form a "V" shape to support and secure the load. The load is therefore wedged between two surfaces which are angled themselves relative to a horizontal 112. Forward member 113 creates an angle 116b above horizontal 112. Rear member 115 creates an angle 116c above horizontal 112. Angles 116a, 116b, and 116c are each greater than zero degrees and, together, total 180 degrees. Outer edges 113b and 115c are each a separate specified distance above horizontal 112.

Forward member 113 includes a cut-out section 114 which extends from outer edge 113b towards joint 117. The cut-out 114 in forward member 113 permits the user access to the load inside tray 103. Hands of the user pass between portions of member 113. This allows the user to reach the load without necessary contact with member 113. The cut-out 114 may extend any distance towards the joint 117, including reaching joint 117 (seen FIG. 7).

Post 105 couples to tray 103 on outer surface 115b. The point of coupling is at a first end 109. Tray 103 includes first end 109 and a second end 111. The second end 111 is opposite of first end 109. Post 105 extends vertically from tray 103. Post 105 has a plurality of holes 119 that run along its length. Post 105 is configured to maintain tray's 103 vertical orientation.

Support 107 couples with post 105 at or above the top most useable hole 119. It is understood that the term top relates to the hole closest to tray 103. Support 107 also couples with outer surface 115b adjacent second end 111. Support 107 and post 105 couple along outer surface 115b in order to negate excessive flexure of tray 103. Minimizing flexure prevents bounce that may occur as tray 103 is loaded. Decreased bounce results in less chance that the load will become dislodged when initially set inside tray 103. It is also understood that the points of coupling on FIGS. 1-3 (and as seen on subsequent figures) may vary in order to better negate excessive flexure of assembly 101.

Figure 4:
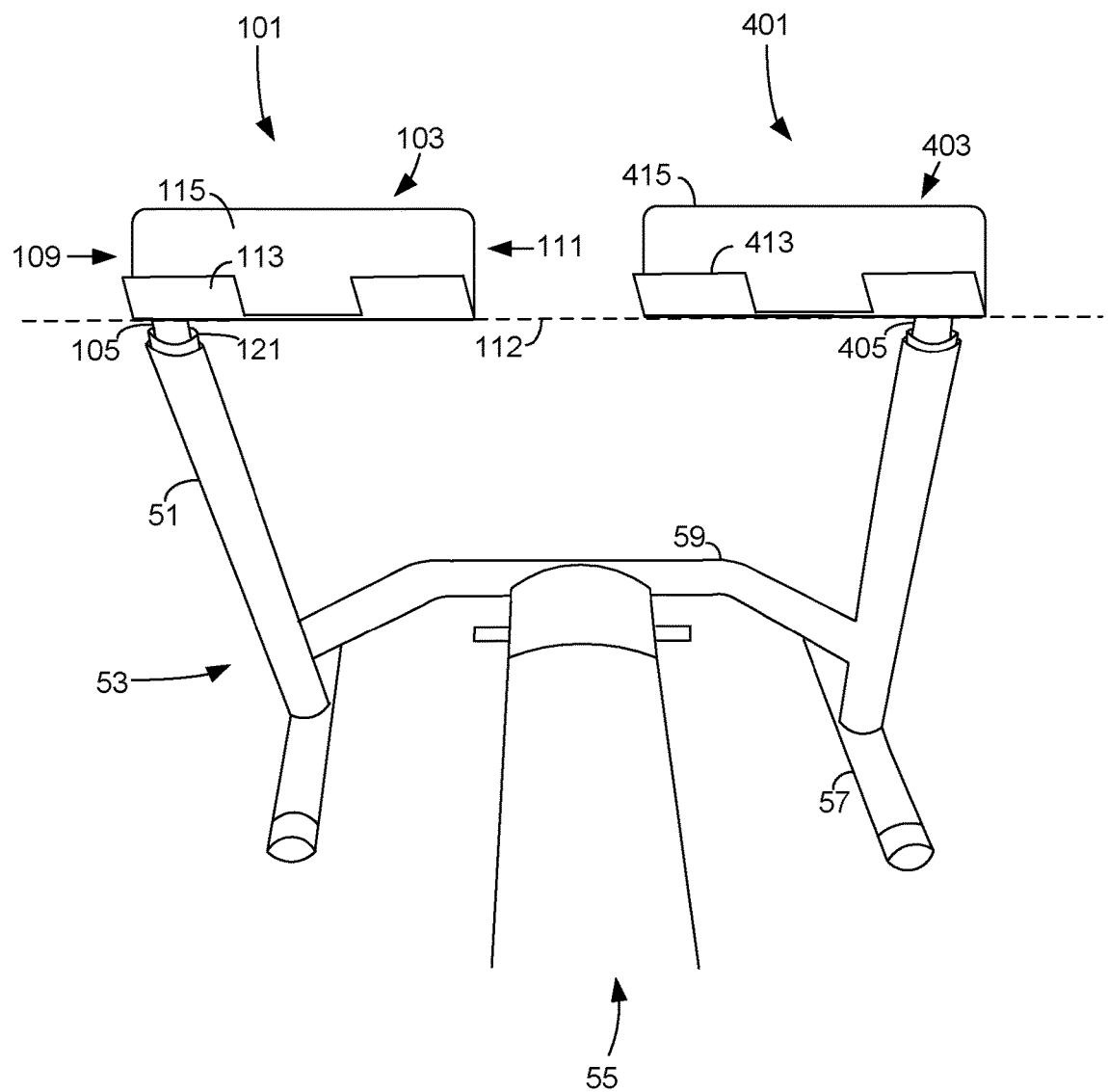
FIG. 4 is a front perspective view of the preferred set-up of the dumbbell bench rack assembly of FIG. 1.

Referring now also to FIG. 4, a front perspective view of exemplary set-up of the dumbbell bench rack assembly 101 in combination with a weight bench 55 is illustrated. As seen in FIG. 4, two separate dumbbell bench rack assemblies are illustrated, one on either side of bench 55. Assembly 401 is similar in form and function to assembly 101 and all the characteristics, features, and attributes of assembly 101 apply equally therein. Assembly 401 is a mirror copy of assembly 101. Together they operate to facilitate exercises on either side of bench 55. As seen in FIG. 4, assembly 401 also has a tray 403, comprised of a forward member 413 and rear member 415, along with a post 405. It is understood that two assemblies 101/401 are necessary for certain work out activities.

Post 105 is inserted into a rack stand 53 to a desired height. Rack stand 53 includes a stand post 51, a stand foot 57 and a connecting bar 59. It is understood that rack stand 53 depicts a generic rack stand and is used here for demonstration purposes only. Rack stand 53 can be separate from a weight bench 55 or rack stand 53 can be in communication with weight bench 55. It is common for the rack stand 53 to have two available spots, one for each of assemblies 101/401.

Grommet 121 is in place and in communication between post 105 and stand post 51. It is understood that grommet 121 stabilizes post 105 while assembly 101 is in communication with rack stand 53.

Figure 5:
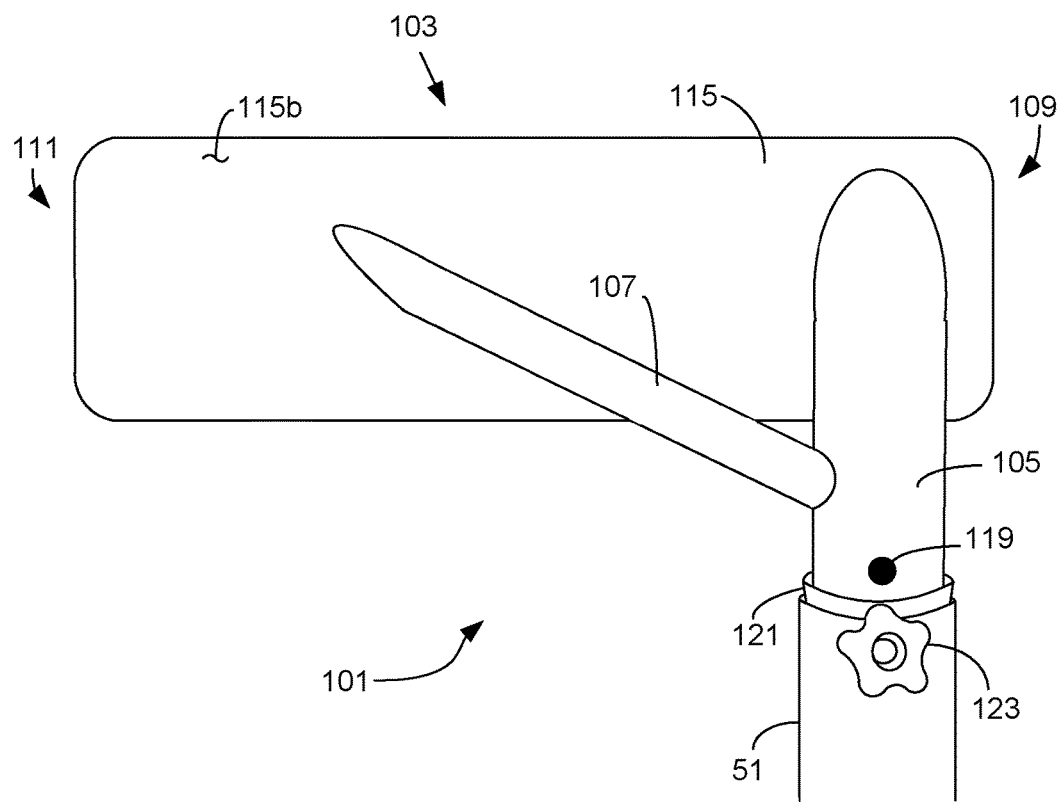
FIG. 5 is a rear view of the dumbbell bench rack assembly of FIG. 4.

Referring now also to FIG. 5, a rear view of the dumbbell bench rack assembly 101 as seen from FIG. 4 is illustrated. Post 105 is inserted inside stand post 51. Assembly 101 may further include grommet 121 and pin 123. Grommet 121 is configured to rest between post 105 and stand 51. Grommet 121 stabilizes post 105 while assembly 101 is in communication with rack stand 53. Pin 123 passes through stand post 51 and hole 119 so as to secure tray 103 at a desired elevation. It is understood that pin 123 passes through a corresponding hole in stand 51 and hole 119. Grommet 121 maintains the vertical orientation of assembly 101. It is understood that the vertical position of rack assembly 101 may also occur by sliding post 105 far enough into rack stand 51 until support 107 is resting on the top of stand post 51.

Figure 6A:
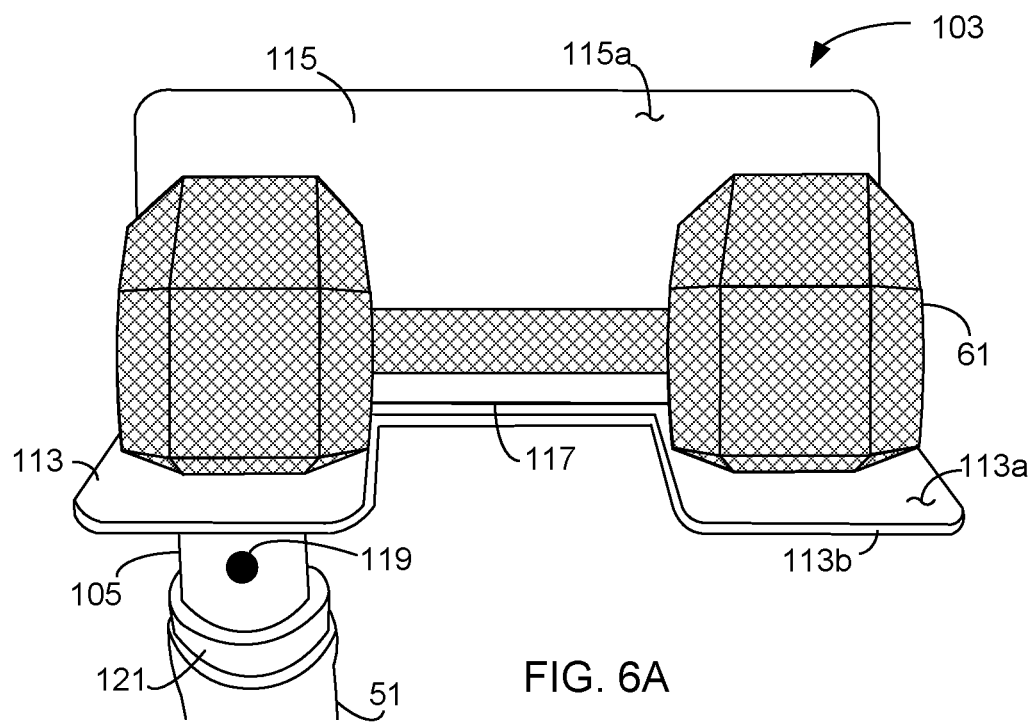
FIGS. 6A-6B are a front and side views respectively of the dumbbell bench rack assembly of FIG. 4 supporting a dumbbell.
Figure 6B:
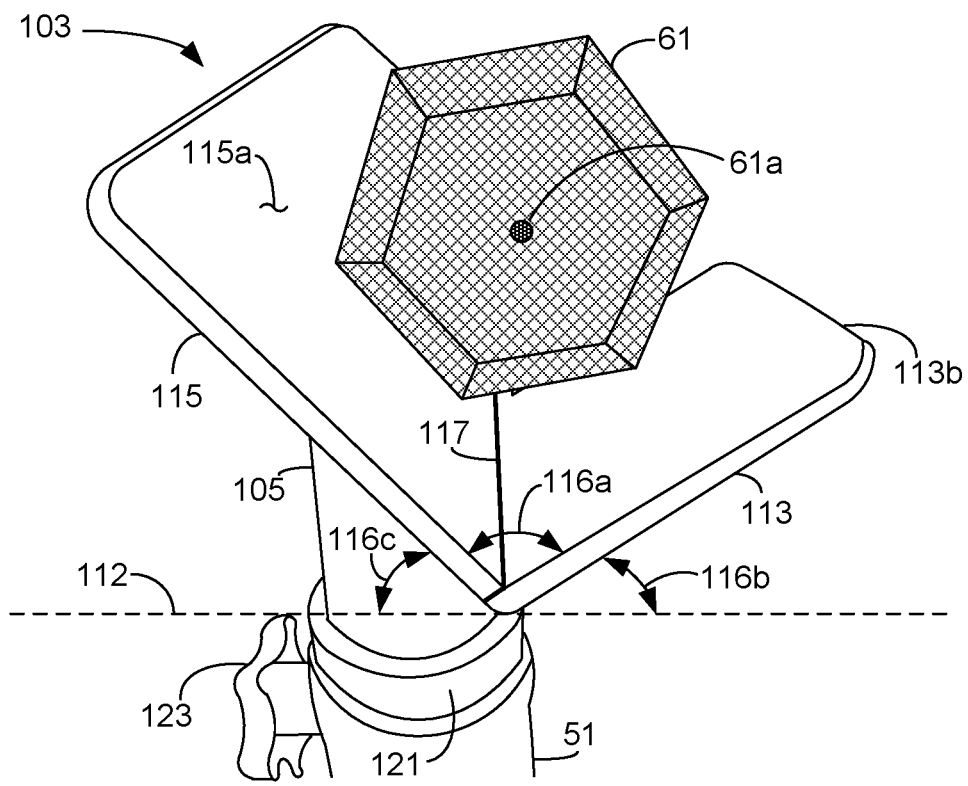

Referring now also to FIGS. 6A-6B, a front and a side view, respectively, of the dumbbell bench rack assembly 101 supporting a dumbbell 61 are illustrated. In operation, users place a weight 61 (dumbbell) on inside surfaces 113a and 115a which define the "V" created by forward member 113 and rear member 115. Weight 61 has a center point 61a. Due to angles 116b and 116c, center point 61a is also located within the "V". It is understood that, depending on the size of the dumbbell, point 61a may rest closer to, or further away from, joint 117. It is also understood that the slope of the surfaces 113a and 115a create a condition whereby weight 61 naturally wants to remain in tray 103 as opposed to rolling out. Of further note is that that point 61a may extend above or over the cut-out 114.

Figure 7:
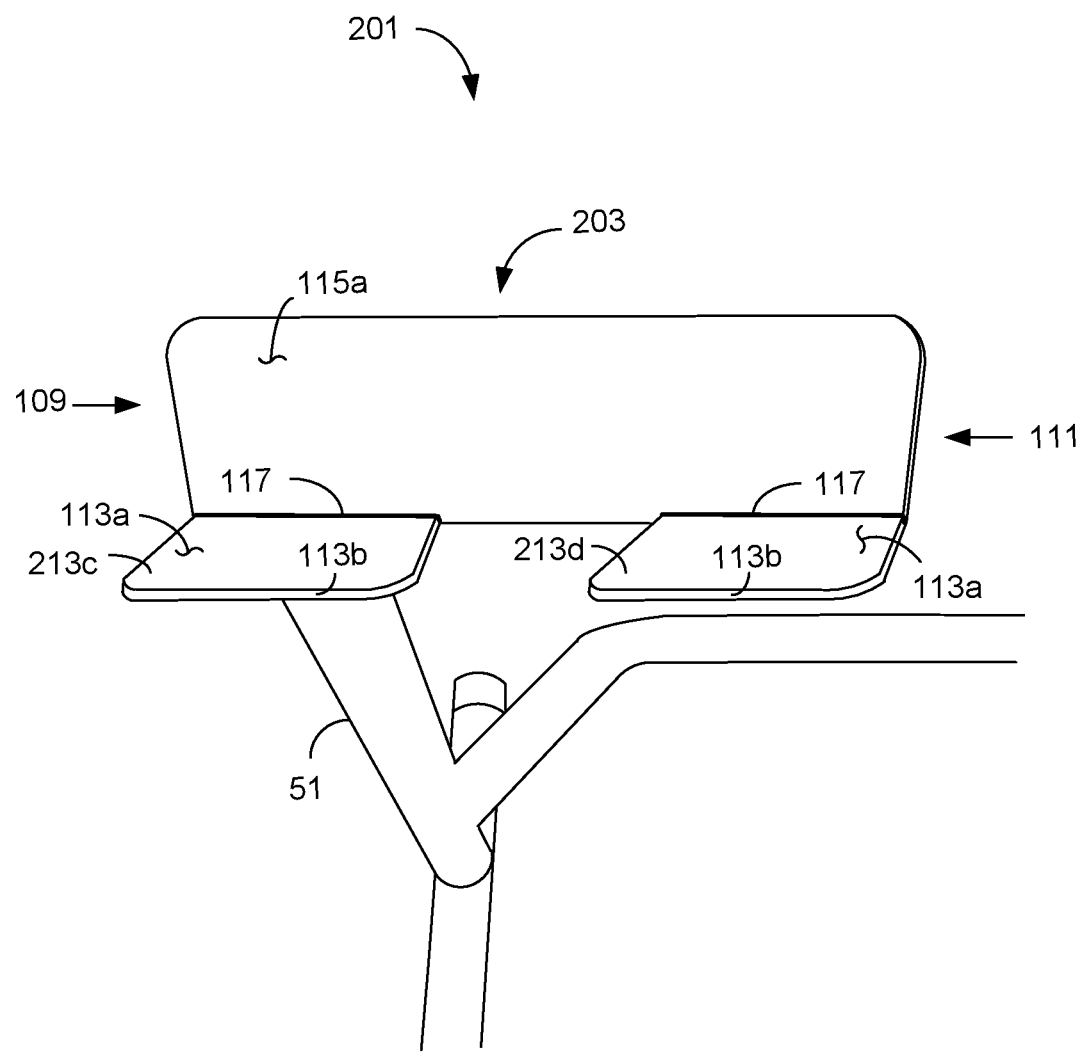
FIG. 7 is an enlarged perspective view of an alternate embodiment of the dumbbell bench rack assembly of FIG. 4.

Referring now also to FIG. 7, an enlarged perspective view of an exemplary embodiment of the dumbbell bench rack assembly 101 is illustrated. Assembly 201 is depicted in FIG. 7. Assembly 201 is similar in form and function to that of assembly 101 except as herein noted. Like reference characters identify corresponding or similar elements in form and function between assembly 201 and assembly 101. In this embodiment, tray 203 includes a cut-out 214 which extends from outer edge 113b to joint 117. The cut-out 214 in essence splits the forward member into a plurality of separate tabs. In this embodiment, the tabs are identified as a tab 213c, adjacent first end 109, and a tab 213d, adjacent second end 111. It is understood that cut-out 214 permits the user greater access to any weights 61 loaded onto the inner surfaces 113a and 115a. Tabs 213c and 213d together form member 113.

Figure 8:
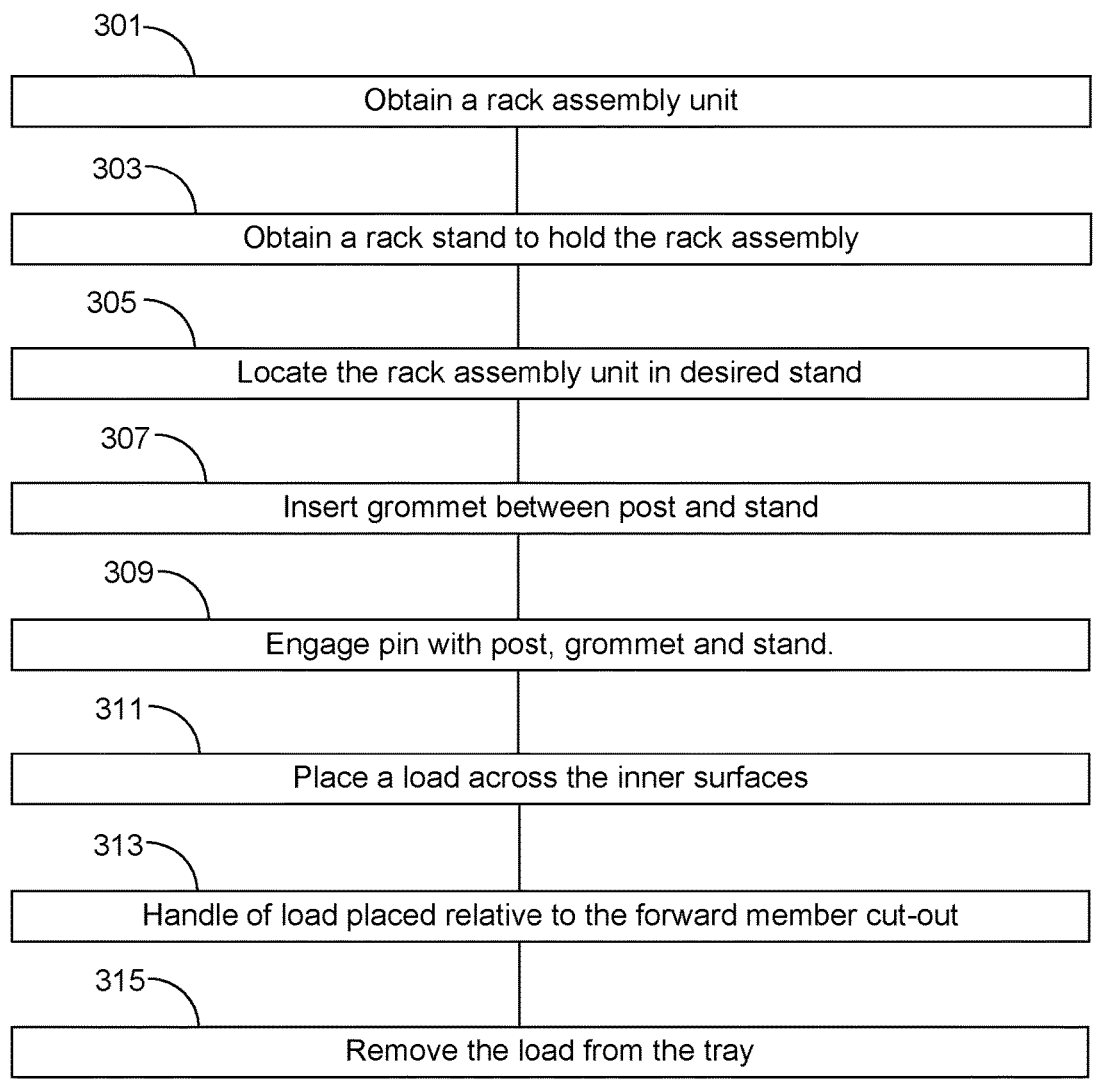
FIG. 8 is a flow chart for the installation and use of the dumbbell bench rack assembly of FIG. 1.

Referring now also to FIG. 8, a flow chart for the installation and use of the dumbbell bench rack assembly is illustrated. Obtain a dumbbell bench rack assembly, step 301. Obtain a rack stand to hold the rack assembly, step 303. It is understood that a rack stand may be obtained before a rack assembly is obtained. The rack stand may be attached to the workout bench or may be free standing. Locate the rack assembly post in the desired rack stand, step 305. Insert grommet between post and stand, step 307. It is understood that the grommet assists in maintaining the rack assembly's upright orientation. Engage a pin with post, grommet (optional), and stand, step 309. It is understood that pin is used to maintain rack assembly's elevation. Place a load across the inner surfaces of rack assembly, step 311. The handle of the load is placed relative to the forward plate cut-out, step 313. The dumbbell weights are located on the forward member and rear member; while the bar connecting the dumbbell's ends is located over the cut-out of the forward member. It is also understood that the load can be from a dumbbell in each tray or a barbell pole straddling both assembly trays. Remove load from the tray, step 315. It is understood that the preferred way to remove the load while the user is on the work out bench is to insert a hand through the cut-out in the forward member, grasp the dumbbell handle, and lift the weight above the tray. It is also understood that the rack assembly is a place to temporarily store dumbbells while the user getting into or out of place on the weight bench. It is further understood that the assembly can be also used to support any type of weight that will fit in the assembly's tray.

The current application has many advantages over the prior art including at least the following: (1) the dumbbell bench rack assembly of the present application is configured to provide users with a safe and effective place to rest dumbbells during the user's workout, (2) the assembly is compact, (3) the assembly has additional support to negate excessive flexure, and (4) the assembly is designed to prevent spillage of the free weight.

The particular embodiments disclosed above are illustrative only and are not intended to be exhaustive or to limit the invention to the precise form disclosed, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A removable rack assembly for a weight bench comprising:
    a vertical post releasably coupled to the weight bench;
    a tray coupled to the post, the tray having a first end and a second end, the tray is coupled to the post under the first end and cantilevered from the post on the second end, the tray having a singular forward member and a singular rear member, each of the forward and the rear member is planer and directly coupled together along a joint extending along the entire width of the forward and the rear member, wherein the vertical post is aligned beneath and in contact with the rear member, the rear member extending over the vertical post, and the joint residing below the point of contact between the rear member and the post, the forward member having an inner surface, the rear member having an inner surface, the inner surfaces being non-parallel and configured to face one another, the rear member and the forward member each angled above a horizontal; and
    a support coupled between the post and the tray to stop flexure of the tray when a load is received on the inner surfaces, the support is coupled to the post beneath the tray, the support couple to the tray at the second end.

2. The assembly in claim 1, further comprising:
    a grommet in communication with the post, the grommet is configured to stabilizate the post.

3. The assembly in claim 1, wherein the post has a plurality of holes.

4. The assembly in claim 1, further comprising:
    a pin in communication with the post.

5. The assembly in claim 1, wherein the post will attach to the rear member starting at the joint and continuing upward along an outer surface of the rear member.

6. The assembly in claim 1, wherein the inner surfaces form an angle between zero and 180 degrees respective to each other.

7. The assembly in claim 1, wherein the tray includes a cut-out section which extends from an outer edge of the forward member towards the joint, the cut-out section stopping prior to the joint.

8. The assembly in claim 7, wherein the cut-out section permits access to the load on the inner surfaces.

9. The assembly in claim 8, wherein the cut-out section will extend from an outer edge of the forward member to the joint.

10. The assembly in claim 8, wherein the forward member is formed from a plurality of separate tabs.

11. A method of using a detachable rack assembly for use with a weight bench, comprising:
    obtaining a detachable rack assembly unit having:
        a vertical post releasably coupled to the weight bench;
        a tray coupled to the post, the tray having a first end and a second end, the tray is coupled to the post under the first end and cantilevered from the post on the second end, the tray having a singular forward member and a singular rear member, each of the forward and the rear member is planer and directly coupled together along a joint extending along the entire width of the forward and the rear member, wherein the vertical post is aligned beneath and in contact with the rear member, the rear member extending over the vertical post, and the joint residing below the point of contact between the rear member and the post, the forward member having an inner surface, the rear member having an inner surface, the inner surfaces being non-parallel and configured to face one another, the rear member and the forward member each angled above a horizontal; and
        a support coupled between the post and the tray to stop flexure of the tray when a load is received on the inner surfaces, the support is coupled to the post beneath the tray, the support couple to the tray at the second end;
    locating the rack assembly unit in a desired stand of the weight bench; and
    placing a load across an inner surface of the tray.

12. The method of claim 11, further comprising:
    obtaining an equipment stand to hold the rack assembly.

13. The method of claim 11, further comprising:
    placing a grommet between a post and stand.

14. The method of claim 11, further comprising:
engaging a pin with a post and stand to maintain rack assembly's elevation.

15. The method of claim 14, further comprising:
placing a handle of a weight relative to a forward plate cut-out.

16. The method of claim 11, further comprising:
removing the load from a tray.

\* \* \* \* \*